United States Patent
Eyles et al.

(10) Patent No.: US 10,250,024 B2
(45) Date of Patent: Apr. 2, 2019

(54) CABLE BREAKOUT SUPPORT

(75) Inventors: Jonathan Mark Eyles, Swindon (GB); Praveen Kurundwad, Hubli (IN); Dharmendra Jain, Gauribidanur Tq (IN); Srivani Chandoor, Bengaluru (IN); Suresh Kumar Muthuswamy, Bengaluru (IN); Shivaprakash Kainthaje, Bangalore (IN)

(73) Assignees: Tyco Electronics UK LTD, Swindon, Wiltshire (GB); Tyco Electronics Corporation India PVT Limited, Bangalore (IN)

( * ) Notice: Subject to any disclaimer, the term of this patent is extended or adjusted under 35 U.S.C. 154(b) by 352 days.

(21) Appl. No.: 13/996,959

(22) PCT Filed: Dec. 12, 2011

(86) PCT No.: PCT/GB2011/052456
§ 371 (c)(1),
(2), (4) Date: Jun. 21, 2013

(87) PCT Pub. No.: WO2012/085536
PCT Pub. Date: Jun. 28, 2012

(65) Prior Publication Data
US 2013/0270400 A1    Oct. 17, 2013

(30) Foreign Application Priority Data

Dec. 22, 2010 (GB) .................................... 102174.4

(51) Int. Cl.
*H02G 3/32* (2006.01)
*H02G 3/04* (2006.01)
*F16L 3/12* (2006.01)

(52) U.S. Cl.
CPC .............. *H02G 3/32* (2013.01); *F16L 3/12* (2013.01); *H02G 3/0431* (2013.01); *H02G 3/0437* (2013.01)

(58) Field of Classification Search
CPC ...... H02G 3/32; H02G 3/0431; H02G 3/0437; F16L 3/12
(Continued)

(56) References Cited

U.S. PATENT DOCUMENTS 2,365,620 A * 12/1944 Banneyer ................. F16L 3/14
                                                       24/335
3,185,418 A *  5/1965 Appleton ................. F16L 3/24
                                                       248/72

(Continued)

FOREIGN PATENT DOCUMENTS

CN    1875529 A      12/2006
DE    7730437 U1 *   1/1978 ............... F16L 3/13
(Continued)

OTHER PUBLICATIONS

International Search Report and Written Opinion issued by the European Patent Office, dated Jan. 16, 2013, for related International Application No. PCT/GB2011/052456; 13 pages.

(Continued)

*Primary Examiner* — Daniel J Troy
*Assistant Examiner* — Guang H Guan
(74) *Attorney, Agent, or Firm* — Faegre Baker Daniels LLP

(57) ABSTRACT

There is provided a cable breakout support, comprising a clamp for clamping to a trunking, and a clip for clipping to a cable breakout of a cable bundle supported in the trunking. Each clamp comprises at least two trunk fittings for fitting to
(Continued)

at least two respective bulbous longitudinal edges of the trunking; and a clip fitting for connecting to a respective clip.

16 Claims, 10 Drawing Sheets

(58) Field of Classification Search
USPC .... 248/65, 68.1, 70, 72, 73, 74.1, 74.2, 237, 248/500, 229.11, 229.21, 228.2, 230.2, 248/231.31
See application file for complete search history.

(56) References Cited

U.S. PATENT DOCUMENTS

| | | | | |
|---|---|---|---|---|
| 3,313,083 A * | 4/1967 | Flora | F16B 5/0642 | 24/297 |
| 3,582,030 A * | 6/1971 | Barrett, Jr. | F16L 3/12 | 248/68.1 |
| 3,705,949 A * | 12/1972 | Weiss | H02G 3/045 | 174/101 |
| 3,968,322 A * | 7/1976 | Taylor | H02G 3/045 | 174/101 |
| 4,136,257 A * | 1/1979 | Taylor | H02G 3/045 | 174/68.3 |
| 4,666,109 A * | 5/1987 | Fallon | F16L 3/16 | 248/50 |
| 4,786,025 A * | 11/1988 | Shuman | G09F 7/20 | 24/107 |
| 4,934,885 A * | 6/1990 | Woods | F16B 5/0233 | 24/453 |
| 5,169,100 A * | 12/1992 | Milcent | F16L 3/233 | 248/224.7 |
| 5,219,134 A * | 6/1993 | Morita | H02G 3/26 | 248/224.7 |
| 6,216,320 B1 * | 4/2001 | Schauermann | F16L 3/24 | 24/293 |
| 6,459,038 B1 | 10/2002 | Waszak et al. | | |
| 6,763,172 B2 * | 7/2004 | Sahlin | G02B 6/4471 | 385/137 |
| 6,810,191 B2 * | 10/2004 | Ferris | G02B 6/4459 | 174/68.3 |
| 6,835,891 B1 | 12/2004 | Herzog et al. | | |
| 7,156,449 B2 * | 1/2007 | Vijaywargiya | B60J 5/0404 | 248/475.1 |
| 7,740,209 B2 * | 6/2010 | Neumann | H05K 3/301 | 248/49 |
| 8,109,482 B2 * | 2/2012 | Oh | A62C 35/68 | 248/342 |
| 8,196,599 B2 * | 6/2012 | Hoskisson | F16L 41/06 | 137/318 |
| 8,226,052 B2 * | 7/2012 | Hancock | F16L 59/135 | 248/61 |
| 8,272,615 B2 * | 9/2012 | Silcox | A62C 35/68 | 169/41 |
| 8,678,332 B2 * | 3/2014 | Benthien | B64C 1/406 | 248/205.3 |
| 9,562,626 B2 * | 2/2017 | Gustin | B64D 47/00 | |
| 2003/0089828 A1 * | 5/2003 | Korczak | F16B 21/075 | 248/68.1 |
| 2005/0098697 A1 * | 5/2005 | Collins | F16L 3/24 | 248/231.71 |
| 2005/0120652 A1 * | 6/2005 | Cacciani | F16L 3/13 | 52/302.1 |
| 2008/0296443 A1 * | 12/2008 | Lunitz | H02G 3/32 | 248/65 |
| 2009/0072098 A1 * | 3/2009 | Smallhorn | H02G 3/32 | 248/68.1 |
| 2009/0294600 A1 * | 12/2009 | Dodge | F16L 3/24 | 248/73 |
| 2010/0116947 A1 * | 5/2010 | Winkler | F16L 3/06 | 248/73 |
| 2010/0155545 A1 * | 6/2010 | Birli | F16L 3/127 | 248/70 |
| 2010/0224737 A1 * | 9/2010 | LaFontaine | H04Q 1/023 | 248/70 |
| 2011/0154623 A1 * | 6/2011 | Schmidt | F16B 2/005 | 24/457 |
| 2011/0198465 A1 * | 8/2011 | Blanchard | H02G 3/263 | 248/226.11 |
| 2013/0270400 A1 * | 10/2013 | Eyles | H02G 3/0437 | 248/72 |

FOREIGN PATENT DOCUMENTS

| | | | | |
|---|---|---|---|---|
| EP | 2399822 A1 * | 12/2011 | | B64C 1/406 |
| FR | 1230634 A * | 9/1960 | | B25B 7/00 |
| GB | 805200 | 12/1958 | | |
| GB | 805200 A * | 12/1958 | | H02G 3/0437 |
| GB | 2130022 A | 5/1984 | | |
| GB | 2429586 A | 2/2007 | | |
| WO | WO 2004/003617 A1 | 1/2004 | | |
| WO | WO 2010/015393 | 2/2010 | | |

OTHER PUBLICATIONS

International Preliminary Report on Patentability issued by the International Bureau of WIPO, Geneva, Switzerland, dated Jun. 25, 2013, for related International Application No. PCT/GB2011/052456; 8 pages.
International Preliminary Report on Patentability issued by the European Patent Office, dated Jun. 25, 2013, for related International Application No. PCT/GB2011/052456; 8 pages.
Examination Report (in Chinese language) dated Jul. 31, 2015, issued by the Chinese Patent and Trademark Office Office for Chinese Application No. 2011800676004; 6 pages.
English Translation of Examination Report dated Jul. 31, 2015, issued by the Chinese Patent and Trademark Office for Chinese Application No. 2011800676004; 8 pages.
Office Action issued by the State Intellectual Property Office of the People's Republic of China, dated Oct. 10, 2016, for related Chinese Patent Application No. 201180067600.4; 9 pages.
English translation of Office Action issued by the State Intellectual Property Office of the People's Republic of China, dated Oct. 10, 2016, for related Chinese Patent Application No. 201180067600.4; 12 pages.
Office Action issued by the Canadian Intellectual Property Office dated Jul. 10, 2017 for related Canadian Patent Application No. 2,822,332; 5 pages.

* cited by examiner

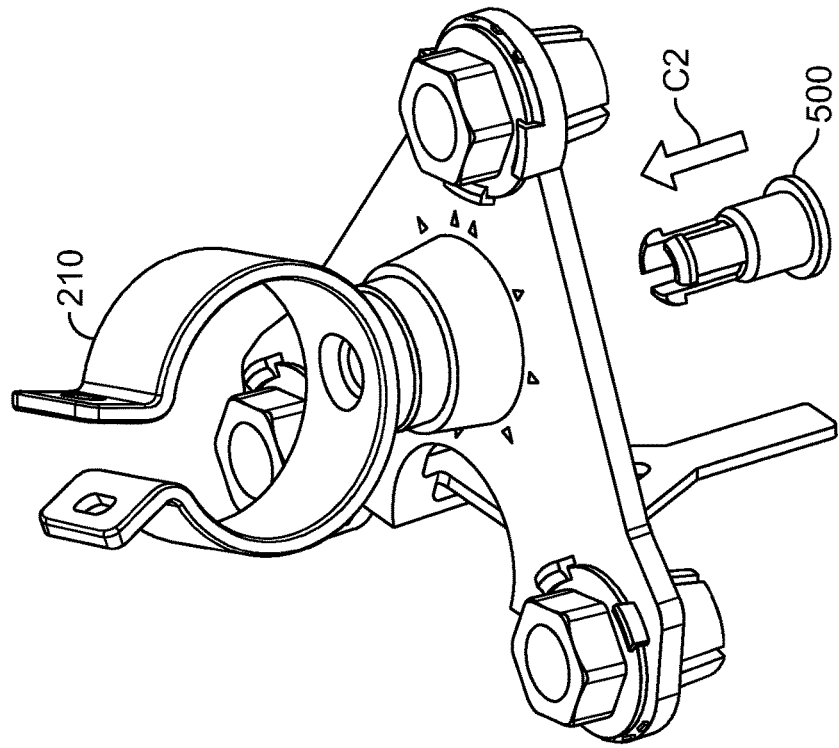
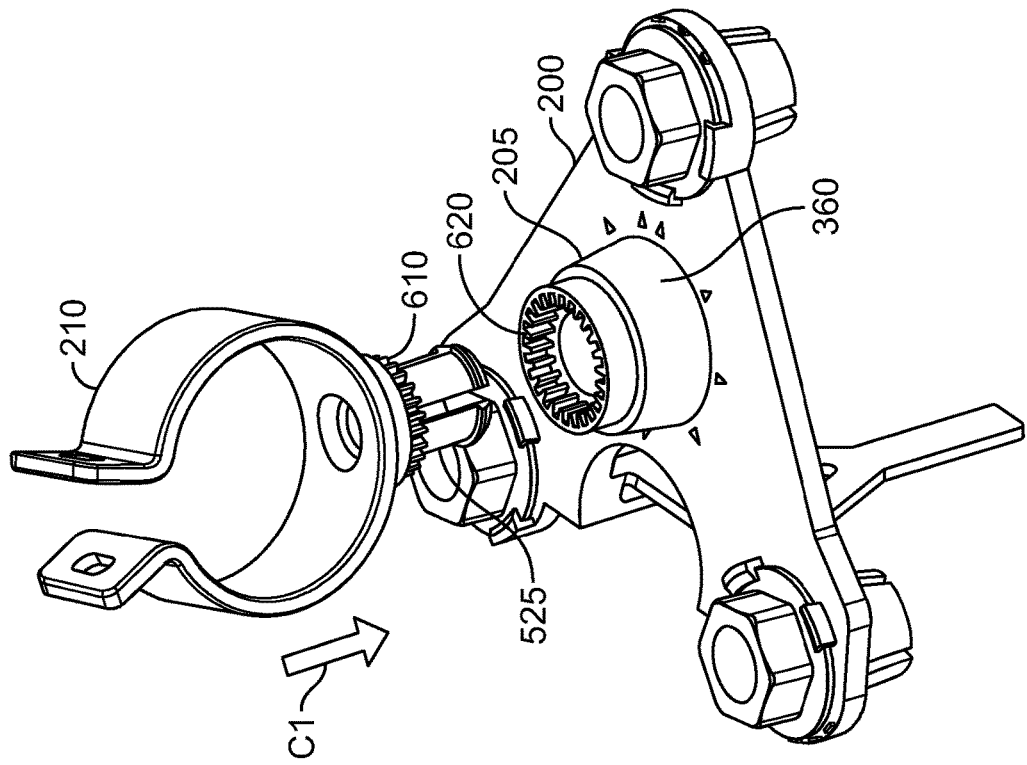
Fig. 6A
Fig. 6B

CABLE BREAKOUT SUPPORT

BACKGROUND OF THE SPECIFICATION

Field of the Invention

The present invention relates to a cable breakout support for supporting a cable breaking out from a bundle of cables.

Trunk structures such as I beams or U beams can be used to support bundles of cables, the cables in each bundle being required to exit the bundle at various different positions along the bundle.

A cable exiting the main bundle of cables may be described as a cable breakout. The cable breakout needs to be routed away from the main bundle in the required direction, and in such a way as to avoid chaffing of the cable breakout against the trunk structure or other adjacent structures.

Trunk structures for aerospace applications may have cable breakouts that need to be accurately and reliably routed with a low risk of chaffing/rubbing against adjacent structures, with bend radii no lower than a minimum value, and without adding significant weight to the aircraft. The routing also needs to be resistant to vibration and temperatures extremes as may be encountered on an aircraft. The speed and ease of installation is another important consideration.

The trunk structure may carry a cable bundle requiring many cable breakouts with different routing directions, and the use of multiple different types of cable routing to accomplish the different routing directions adds cost and complexity.

It is therefore an aim of the invention to provide an improved cable breakout support.

BRIEF SUMMARY OF THE INVENTION

According to an embodiment of the invention, there is provided a cable breakout support, comprising a clamp for clamping to a trunking, and a clip for clipping to a cable breakout of a cable bundle supported in the trunking, each clamp comprising:

at least two trunk fittings for fitting to at least two respective bulbous longitudinal edges of the trunking; and a clip fitting for connecting to a respective clip.

The at least two longitudinal edges of the trunking are provided with a bulbous cross section, and each clamp has at least two trunk fittings for fitting to the at least two respective longitudinal edges. The use of two trunk fittings per clamp in conjunction with the bulbous edges of the trunking can help provide a safe and secure connection of the clamp to the trunking. Furthermore, the connection of the clamp between two longitudinal edges may make the clamp ideally placed for clipping a cable breakout with a clip connected to a clip fitting of the clamp.

The cable breakout supports may be comprised within a modular cable breakout support system, in which differently shaped clamps are all compatible with differently shaped clips. Then the clamp appropriate for the particular trunking may fit with the clip appropriate for the particular breakout cable, without any compatibility issues arising between the clamp and the clip.

Advantageously, each trunk fitting may comprise a slot for receiving one of the bulbous longitudinal edges of the trunking. Furthermore, the slot may be formed across the end of a trunk socket of the trunk fitting, and a collet may be provided for insertion into the trunk socket. The collet may have a further slot for aligning with the slop of the socket, and may be used to help grip a bulbous edge of the trunking. Additionally, the collet may have a tapered portion, the taper for compressing the collet around the bulbous longitudinal edge of the trunking when the collet is fully inserted into the trunk socket.

Advantageously, each clip fitting may comprise a clip socket, and each clip may comprise a plug for insertion into the clip socket. The shapes and sizes of the clip socket and the clip plug may be standardised across a modular system to ensure compatibility between clip socket and the clip plug. The clip socket may be open ended, and the cable breakout support may further comprise a clip lock for inserting into the other end of the clip socket from the plug, the clip lock engaging with the plug to secure the plug in the clip socket.

The clip fitting and the clip may comprise corresponding indentations and protrusions for fixing the rotational position of the clip relative to the clamp. The indentations and protrusions may lock the clip in one of several different rotational positions, thereby enabling control over the angle at which the breakout cable is held at by the clip.

Advantageously, the clamp may be formed as two interlocking parts, the first part comprising one of the trunk fittings and the second part comprising the other of the trunk fittings. The first and second parts may be interlocked to hold the opposing bulbous longitudinal edges of an I shaped trunk across the top or the bottom of the I within the trunk fittings.

Alternatively, the clamp may be triangular and comprises three trunk fittings at the corners of the triangular clamp, the trunk fittings for fitting onto the bulbous longitudinal edges of a U shaped trunk across the top of the U. Two of the trunk fittings may fit onto one of the bulbous longitudinal edges, and the remaining trunk fitting may fit onto the other of the bulbous longitudinal edges, thereby providing a secure connection between the clamp and the trunk.

BRIEF DESCRIPTION OF THE DRAWINGS

Embodiments of the invention will now be described with reference to the accompanying drawings, in which:

FIGS. 6a and 6b show schematic perspective diagrams of the fitting together of the clamp and clip of the first embodiment;

DETAILED DESCRIPTION OF THE INVENTION

Figure 1:
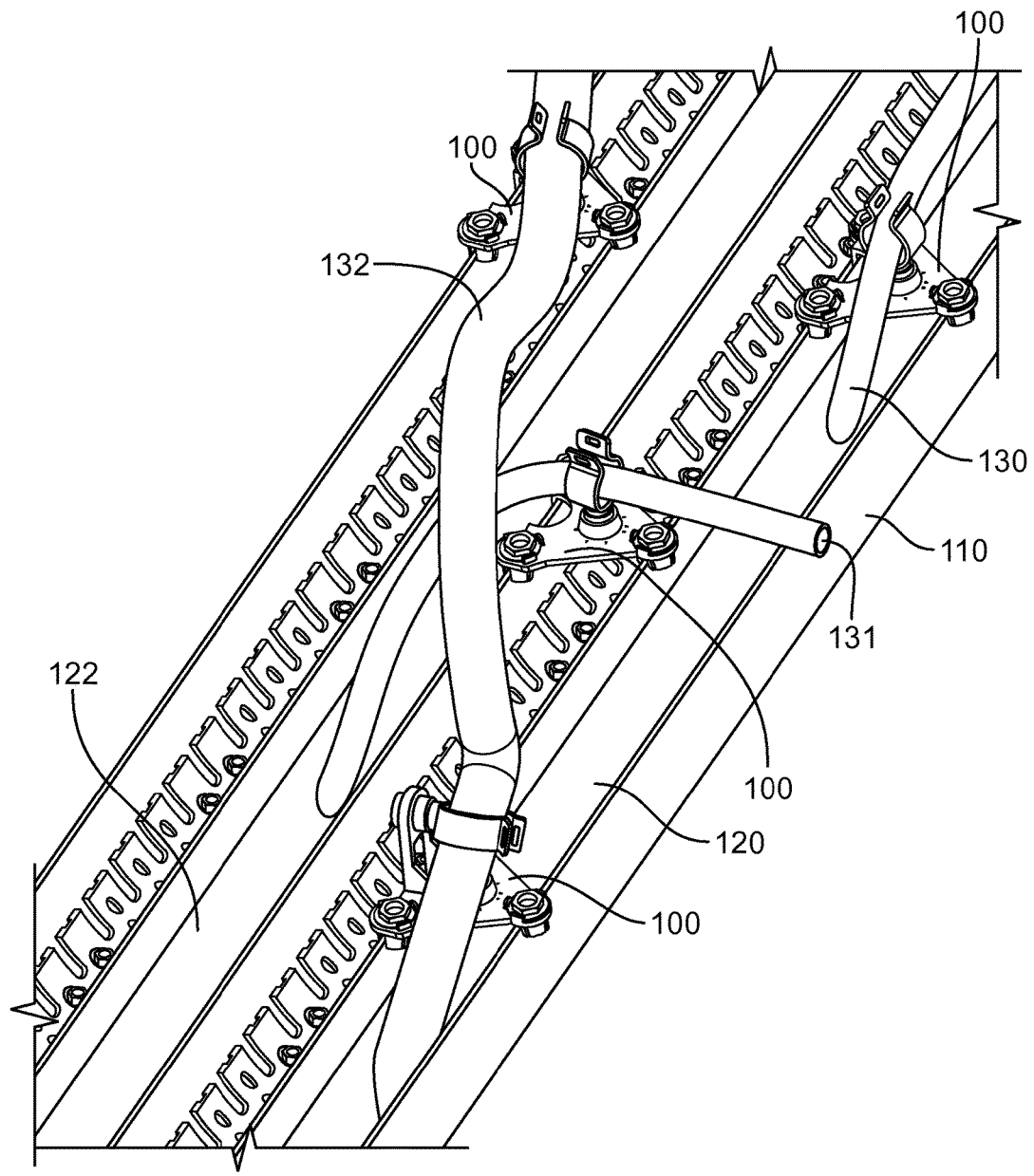
FIG. 1 shows a schematic perspective diagram of a cable breakout support according to a first embodiment of the invention being used to route cable breakouts on U shaped trunking.

A first embodiment of the invention will now be described with reference to FIGS. 1-8. FIG. 1 shows a U shaped trunking 110, comprising multiple U shapes arranged side by side with one another. Cable bundles 120 and 122 are supported in the trunking and cable breakouts 130, 131 and 132 exit from the cable bundles at various different positions along the cable bundles.

The cable breakouts are clipped to cable breakout supports 100, which hold the cables in place and direct them in the desired directions. As shown in the enlarged perspective view of FIG. 2, a cable breakout support 100 comprises a clamp 200 for clamping to the trunking 110, and a clip 210 for clipping to a cable breakout.

The clamp 200 comprises three trunk fittings 202 and a clip fitting 205. Two of the trunk fittings 202 engage with two respective bulbous longitudinal edges 111 and 112 of the trunking 110. The bulbous longitudinal edges run longitudinally along the trunking and have a bulbous cross section, the bulbous cross section enabling secure engagement with the trunk fittings. The third trunk fitting 202 engages with one of the two respective bulbous longitudinal edges to provide extra security against the clamp sliding longitudinally along the trunking. The clip fitting 205 engages with the clip 210.

The cable breakout supports 100 shown in FIG. 1 collectively form a modular cable breakout support system, in which differently shaped clamps 200 are all compatible with differently shaped clips 205.

Figure 2:
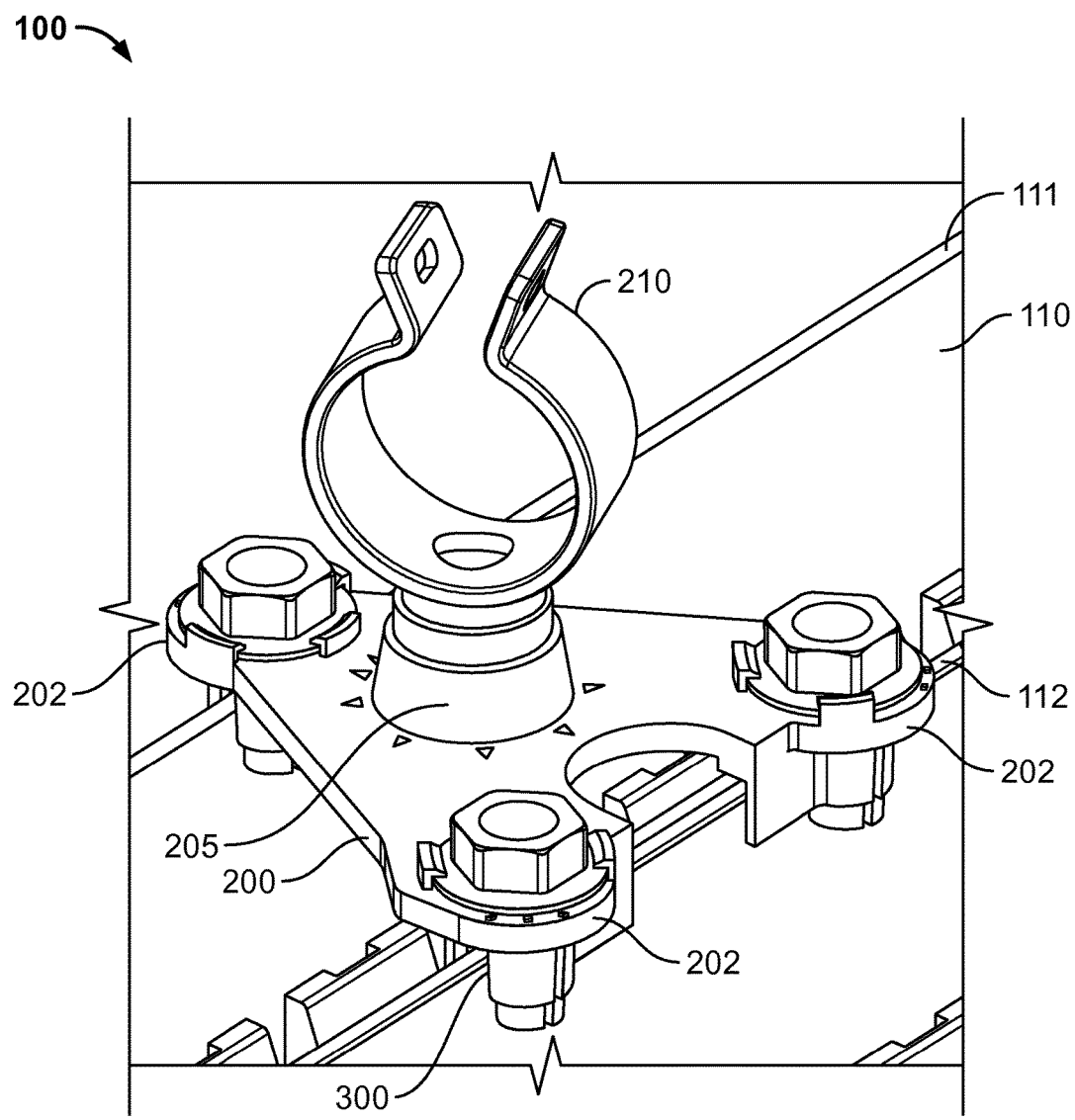
FIG. 2 shows an enlarged schematic perspective diagram of the cable breakout support of FIG. 1.
Figure 3A:
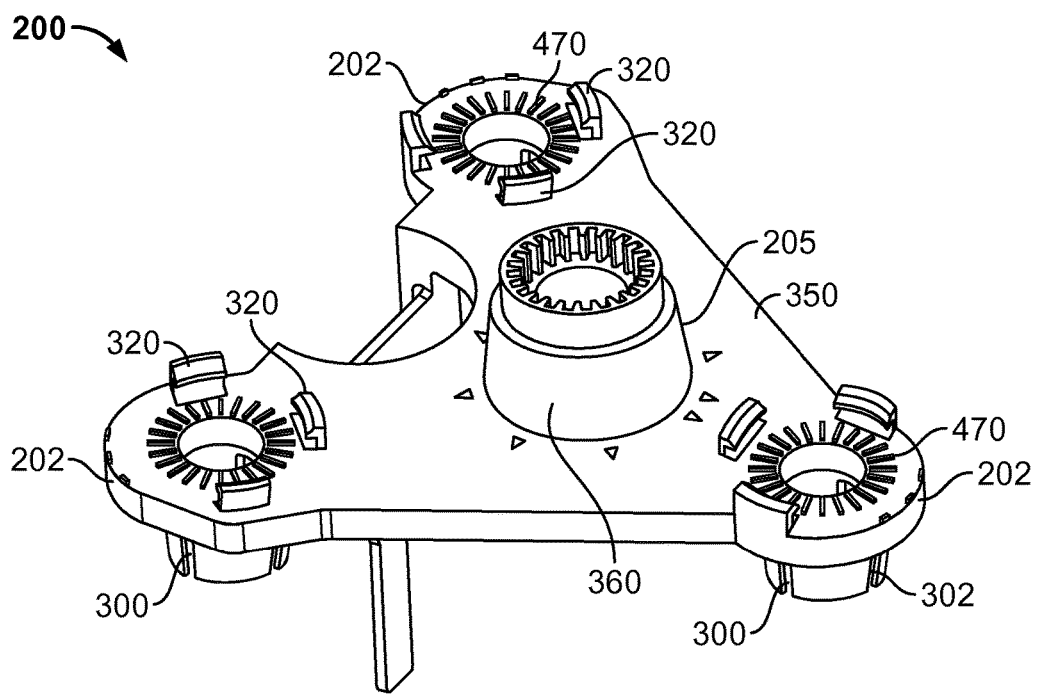
FIGS. 3a and 3b show upper and lower schematic perspective diagrams of the clamp of the first embodiment.
Figure 3B:
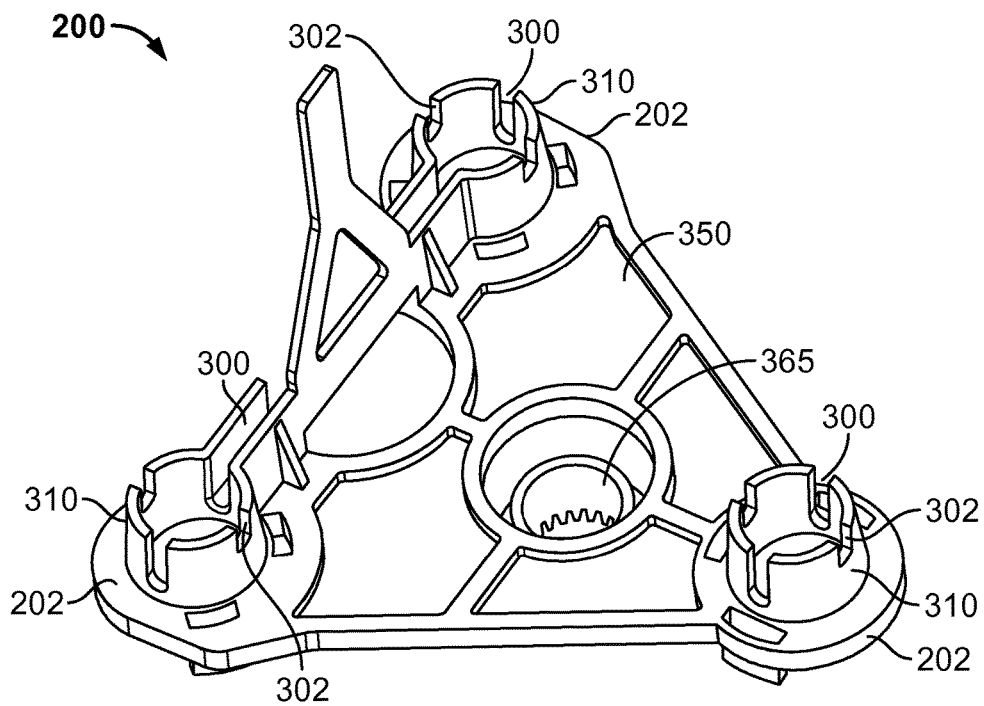

FIGS. 3a and 3b show top and bottom perspective diagrams of the clamp 200 of FIG. 2. The trunk fittings 202 are formed at the corners of a triangular plate 350, and each comprise a trunk socket 310. The trunk sockets 310 each have a slot 300 formed across them for receiving bulbous longitudinal edges of the trunking. In this particular embodiment, the trunk sockets 310 are formed as cylinders with axes extending perpendicular to the plate 350, and the slots are formed as two diametrically opposed slots in the walls of the cylinders.

In this embodiment, the trunk sockets 310 are open ended trunk sockets extending through the plate 350. Ridges 470 are formed around the open ends of the trunk sockets, opposite to the ends of the trunk sockets where the slots 300 are formed.

Overhanging protrusions 320 are also formed around the open ends of the trunk sockets 310, opposite to the ends of the trunk sockets where the slots 300 are formed. In this embodiment there a three overhanging protrusions for each trunk socket, formed at 0, 90, and 180 degrees around each trunk socket. The overhangs are directed towards the centres of the trunk sockets.

Each trunk socket 310 further comprises additional slots 302, which are formed as two diametrically opposed slots in the walls of the cylinders. The additional slots 302 are perpendicular to the slots 300.

The clip fitting 205 is formed at the centre of the triangular plate 350, and comprises a clip socket 360. The clip socket 360 is an open ended socket, and formed as a cylinder extending through the plate 350 with axis perpendicular to the plate 350. The clip socket 360 has a ridge 365 inside the socket and extending around the axis of the socket, the ridge for engaging with the clip 210.

Figure 4A:
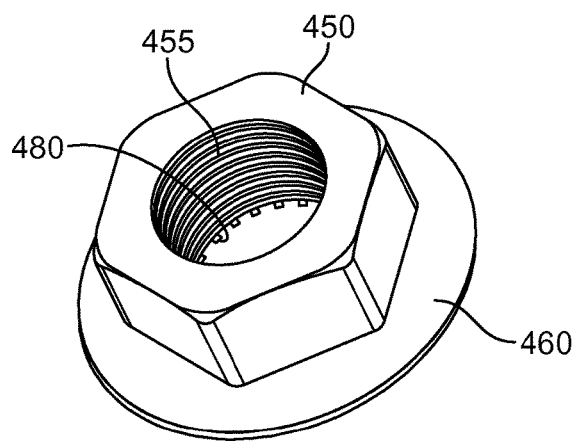
FIGS. 4a and 4b show schematic perspective diagrams of a nut and a collet of the first embodiment.
Figure 4B:
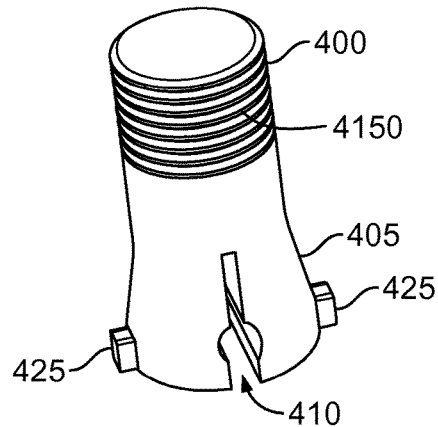

FIG. 4a shows a perspective diagram of a nut 450 for use with a collet 400 shown in FIG. 4b. The nut 450 and collet 400 are together used for securing one of the trunk fittings 202 to a bulbous longitudinal edge of a trunk.

The nut 450 comprises a screw thread 455, and a flange 460 around the axis of the nut and at one end of the nut. The flange has ridges 480 extending away from the axis of the nut.

The collet 400 comprises a screw thread 4150 onto which the nut 450 may be screwed, and a further slot 410 at the opposite end of the collet from the screw thread. The further slot 410 comprises a wider section 420 at the open end of the slot, and a narrower section 415 beyond the wider section (see FIG. 7). The collet 400 also comprises a tapered portion 405, such that the collet is wider at end of the further slot 410 than at the end of the screw thread 4150. The collet further comprises two protrusions 425 at the end of the collet having the slot. The collet 400 is shaped to fit through the open ended trunk sockets 310.

The attachment of one of the trunk fittings 205 to a bulbous longitudinal edge 111 of the trunking will now be described with reference to FIG. 7.

Figure 7:
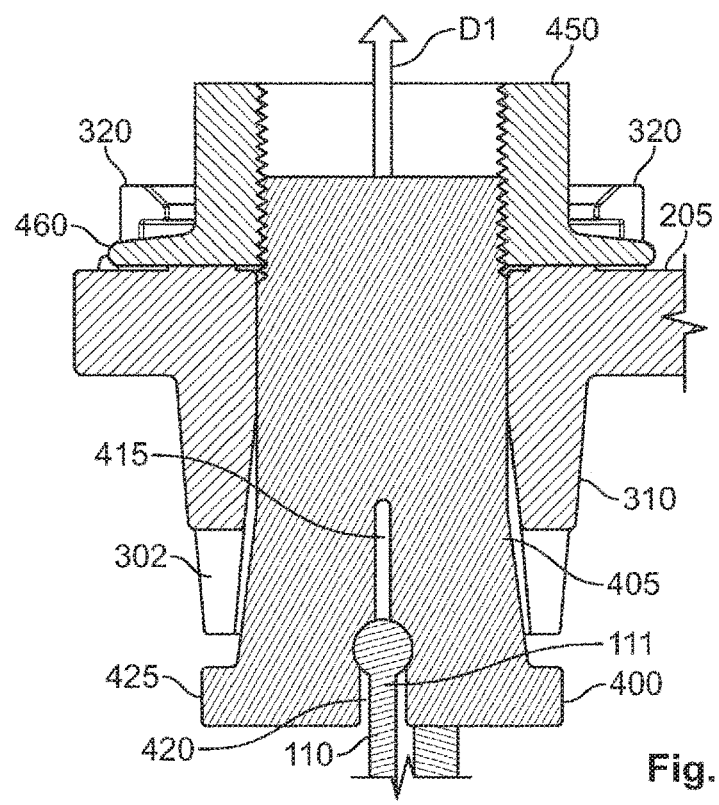
FIG. 7 shows a schematic cross-sectional diagram of a trunk fitting of the first embodiment being fitted to a bulbous longitudinal edge of a trunking.

FIG. 7 shows a cross sectional diagram of a trunk fitting 205 having a socket 310, in which a collet 400 has been inserted. The collet is inserted such that the further slot 410 of the collet is aligned with the slot 300 of the socket 310. The alignment is assured by the protrusions 425 of the collet, which fit into the additional slots 302 of the socket 310. Part of the bulbous longitudinal edge 111 of the trunking 110 has been inserted into the wider section 420 of the further slot 410 of the collet. The tapered portion 405 of the collet rests against the entrance to the socket 310.

The nut 450 is partially screwed onto the end of the collet 400, and the flange 460 of the nut fits beneath the overhanging protrusions 320 of the trunk fitting 205. To fix the trunk fitting 205 to the bulbous longitudinal edge 111, the nut 450 is tightened, drawing the collet 400 and the bulbous longitudinal edge 111 further into the socket 310 in a direction D1. The taper 405 of the collet means that the collet is compressed around the bulbous longitudinal edge 11 as the collet is drawn further into the socket 310, securing the trunk fitting to the bulbous longitudinal edge.

The ridges 470 (see FIG. 3a) around the open end of the socket 310 engage with the ridges 480 on the flange 460 of the nut once the nut is fully tightened over the collet, the ridges 470 and 480 helping prevent un-intentional unscrewing of the nut from the collet.

The bulbous longitudinal edge 111 has an oval cross section, although other bulbous longitudinal edges where the where width of the trunking sidewall closer to the longitudinal edge is greater than the width of the trunking sidewall further away from the longitudinal edge are also possible. The greater width closer to the longitudinal edge can be considered as a protruding section with which the trunk fitting of the clamp can securely engage.

Figure 5A:
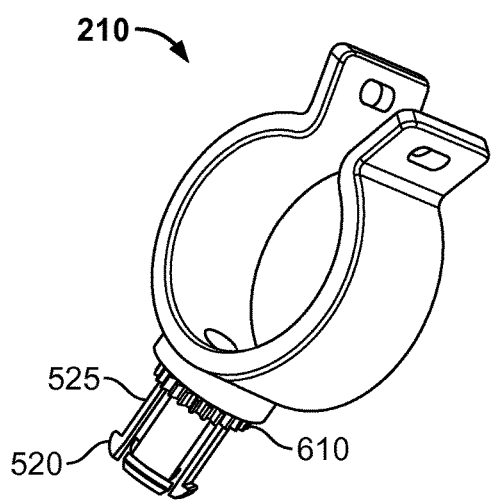
FIGS. 5a and 5b show schematic perspective diagrams of a clip and a clip lock of the first embodiment.
Figure 5B:
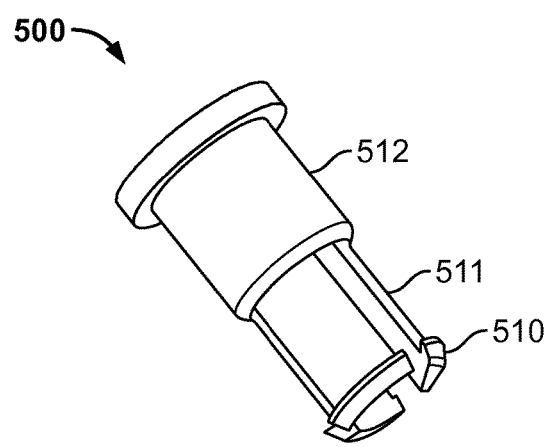

FIG. 5a shows a more detailed diagram of the clip 210, and FIG. 5b shows a diagram of a clip lock 500 for use with the clip 210. The clip lock 500 is used to secure the clip 210 to the clip fitting 205 of the clamp.

The clip 210 comprises two opposing arms 530 for gripping the cable breakout between the arms, and a plug 525 for engaging with the clip socket 360 of the clip fitting 205. The plug 525 is cylindrical and has protrusions 520 that are inwardly compressible toward the axis of the plug, and a set of teeth 610 arranged around the axis of the plug.

The surfaces of the clip 210 that are used to grip the cable breakout may be lined with a material such as silicone rubber to protect the cable breakout and provide the required level of grip on the cable breakout. Two apertures at the ends of the arms of the clip may have a retainer applied to them to hold the arms together and grip the cable breakout. The retainer may for example be a cable tie, the cable tie being threaded through the apertures and then tightened to draw the arms together and improve the level of grip on the cable breakout.

The clip lock 500 in this embodiment is cylindrical, and has protrusions 510 that are inwardly compressible towards the axis of the cylinder. The diameter of at least a portion of the cylinder is small enough for the portion to be inserted inside the plug 525. The click lock 500 has a flexible portion 511 with slots enabling inward compression of the protrusions, and a shoulder portion 512 of greater diameter than the flexible portion.

The attachment of the clip 210 to the clip fitting 205 of the clamp will now be described with reference to FIGS. 6a-6b.

Figure 6C:
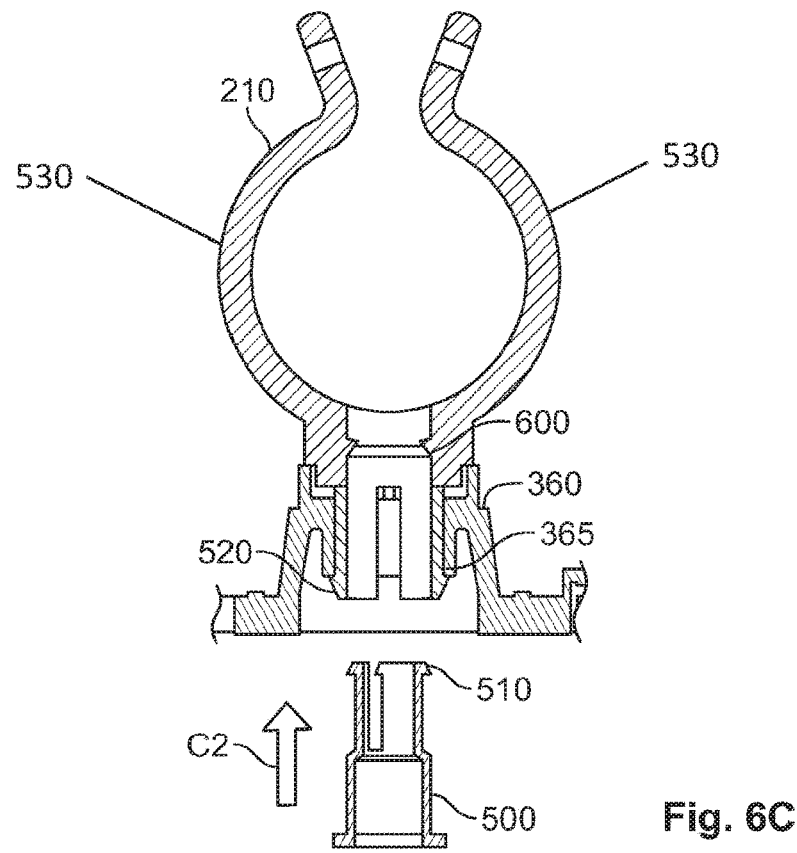
FIGS. 6c and 6d show schematic cross-sectional diagrams of the fitting together of the clamp and clip of the first embodiment.

Firstly, as shown in FIG. 6a, the plug 525 of the clip 210 is inserted in a direction C1 into the clip socket 360 of the clamp 200. Upon insertion, the teeth 610 of the plug 525 engage with teeth 620 of the clip socket 360 to lock the rotational orientation of the clip 210 relative to the clamp 200. The rotational orientation is set such that the arms 530 of the clip direct the cable breakout in the required direction. As can be seen in FIG. 6c, the protrusions 520 of the clip 210 engage with the ridge 365 of the socket 360. The ridge 365 is also visible in FIG. 3b.

Secondly, as shown in FIG. 6b, the clip lock 500 is inserted in a direction C2 into the clip socket 360 of the clamp 200. The clip lock 500 is inserted into the socket 360 from the opposite direction to what the plug 525 is inserted, i.e. direction C2 is opposite to direction C1.

Figure 6D:
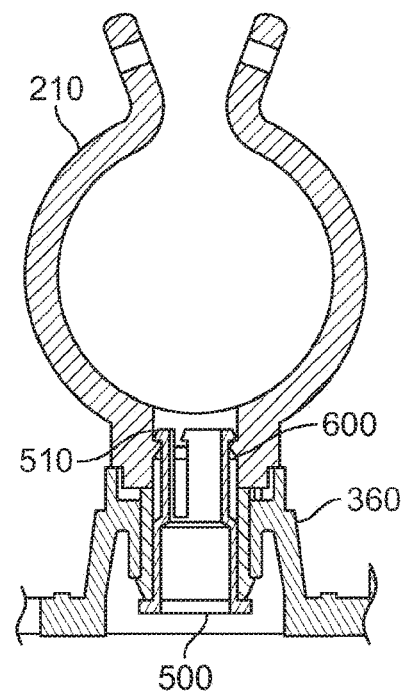

A cross sectional diagram of the insertion of the clip lock 500 into the socket 360 is shown in FIGS. 6c and 6d. The cylindrical plug 525 comprises ridge 600 inside the cylindrical plug and extending around the axis of the cylindrical plug. When the clip lock 500 is inserted into the socket 360 in direction C2, the flexible portion 511 and shoulder portion 512 of the clip lock go inside of the cylindrical plug 525, and the protrusions 510 of the clip lock engage with the ridge 600. The shoulder portion 512 contacts the inside of the cylindrical plug 525 and prevents the protrusions 520 of the cylindrical plug from dis-engaging with the ridge 365 of the socket.

Figure 8:
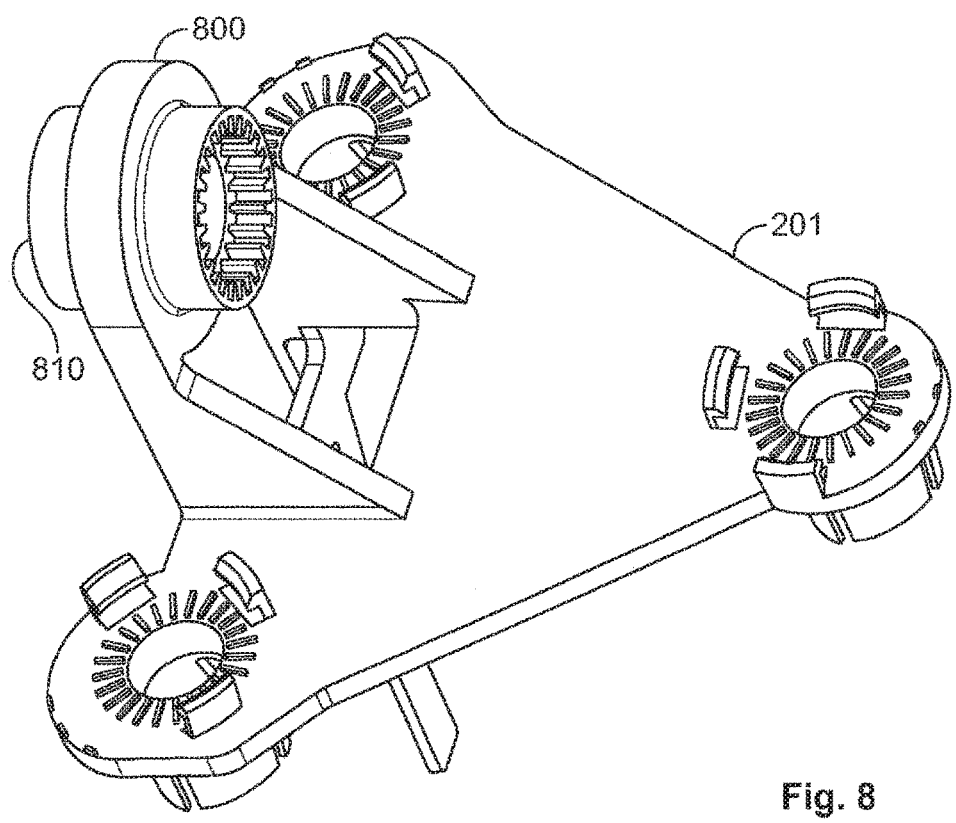
FIG. 8 shows a schematic perspective diagram of an alternate clamp for use in the first embodiment.

FIG. 8 shows a schematic perspective diagram of an alternate clamp 201 for use in the first embodiment. The alternate clamp 201 is the same as the clamp 200, except for that the clip fitting 800 is arranged differently to the clip fitting 205 of FIG. 3a. The clip fitting 800 comprises a clip socket 810 similar to the clip socket 360 of FIG. 3a, except that the clip socket 810 is arranged at one of the edges of the triangular plate and has an axis that is aligned with the plane of the triangular plate.

The components of the cable breakout support are formed from nylon, although other materials such as other polymers or metals may also be used.

Figure 9:
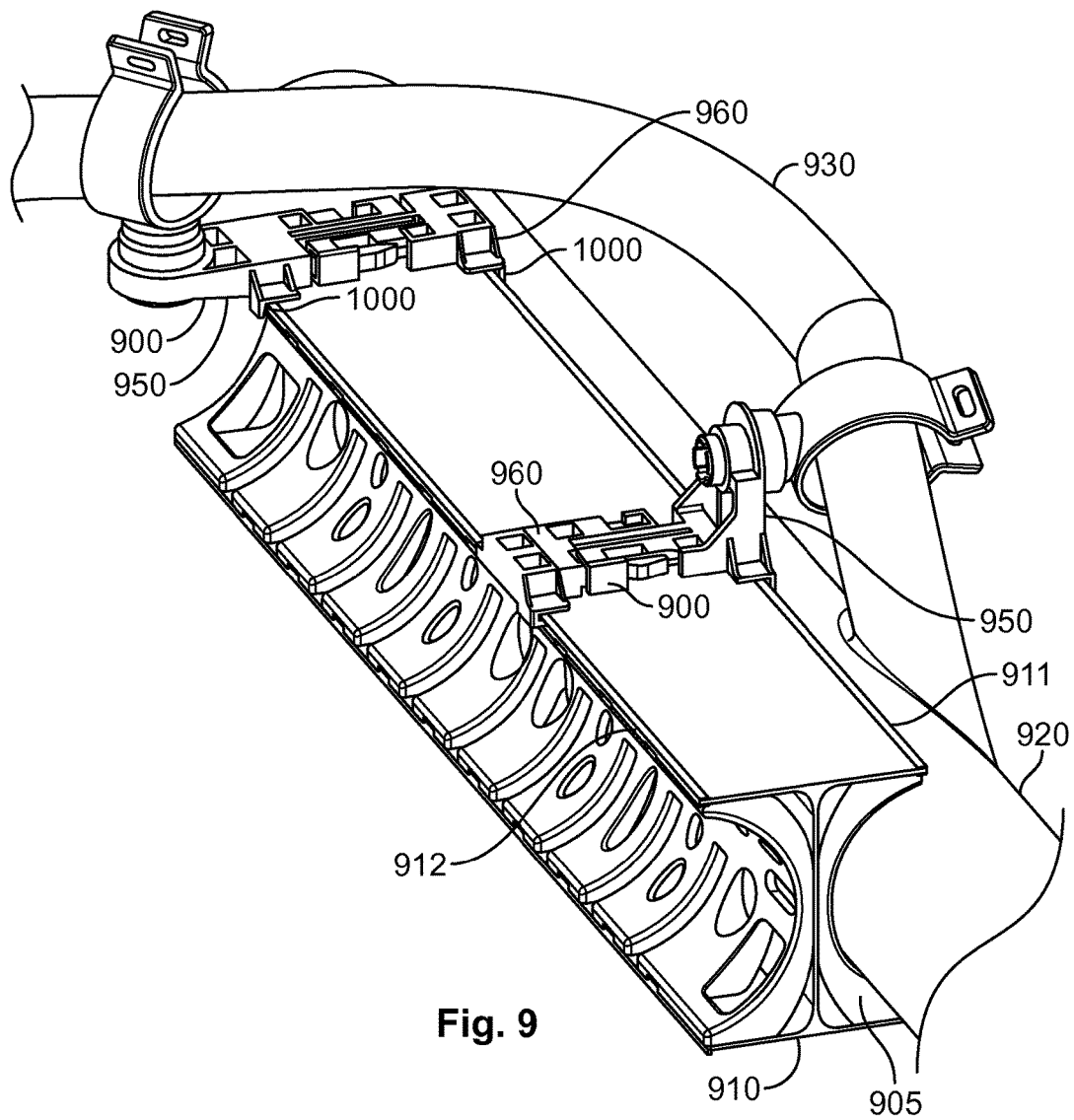
FIG. 9 shows a schematic perspective diagram of a cable breakout support according to a second embodiment of the invention being used to route cable breakouts on I shaped trunking.

A second embodiment of the invention will now be described with reference to FIGS. 9-11. FIG. 9 shows a schematic perspective diagram of two cable breakout supports 900 being used to route a cable breakout 930 on I shaped trunking 910. The I shaped trunking has bulbous longitudinal edges 911 and 912, and a cable support 905 being used to support a bundle of cables 920.

The cable breakout supports 900 each comprise a clamp having a first part 950 and a second part 960, the parts interlocking with one another in a snap fit. The first and second parts of the clamp each comprise a trunk fitting in the form of a slot 1000 for receiving a bulbous longitudinal edge of the trunking 910.

The clamp is attached across the top of the I shaped trunking by placing the first and second parts of the clamp with two respective bulbous longitudinal edges of the trunking inside the respective slots of the first and second parts, and then snap fitting the first and second parts together. The snap fit prevents the first and second parts from disengaging with one another, keeping the bulbous longitudinal edges 911 and 912 within the slots 1000.

The slots 1000 comprise enlarged portions 1010 at the closed ends of the slots, which can snap over the bulbous longitudinal edges 911 and 912, and thereby help secure the first and second parts of the clamp to the trunking.

Figure 10A:
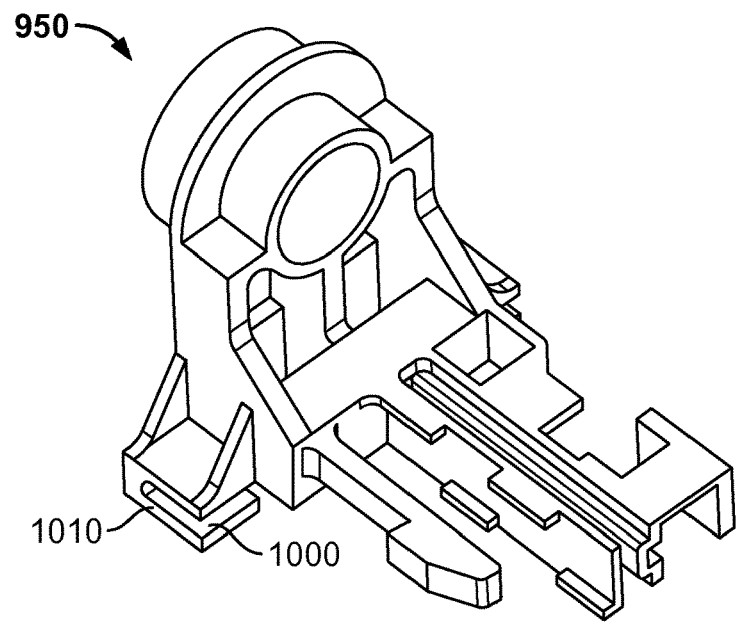
FIGS. 10a and 10b show schematic perspective diagrams of first parts of clamps of the second embodiment.
Figure 10B:
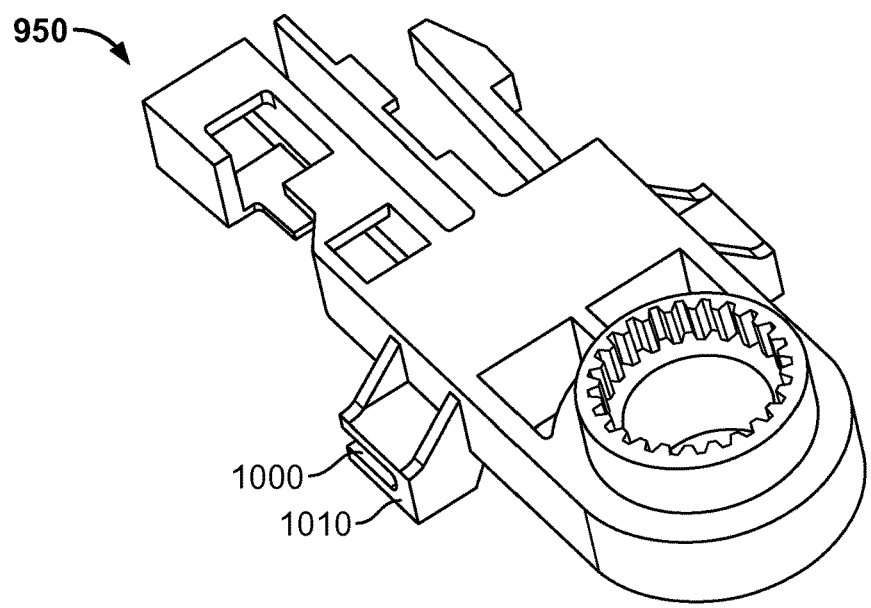

The clamp comprises a clip fitting on the first part 950 of the clamp, the clip fitting being the same as the clip fittings 405 or 800 of the first embodiment. As shown in FIG. 10a, the clip fitting may be arranged with its axis in line with the plane of the slot 1000, or as shown in FIG. 10b, the clip fitting may be arranged with its axis perpendicular to the slot 1000.

Figure 11:
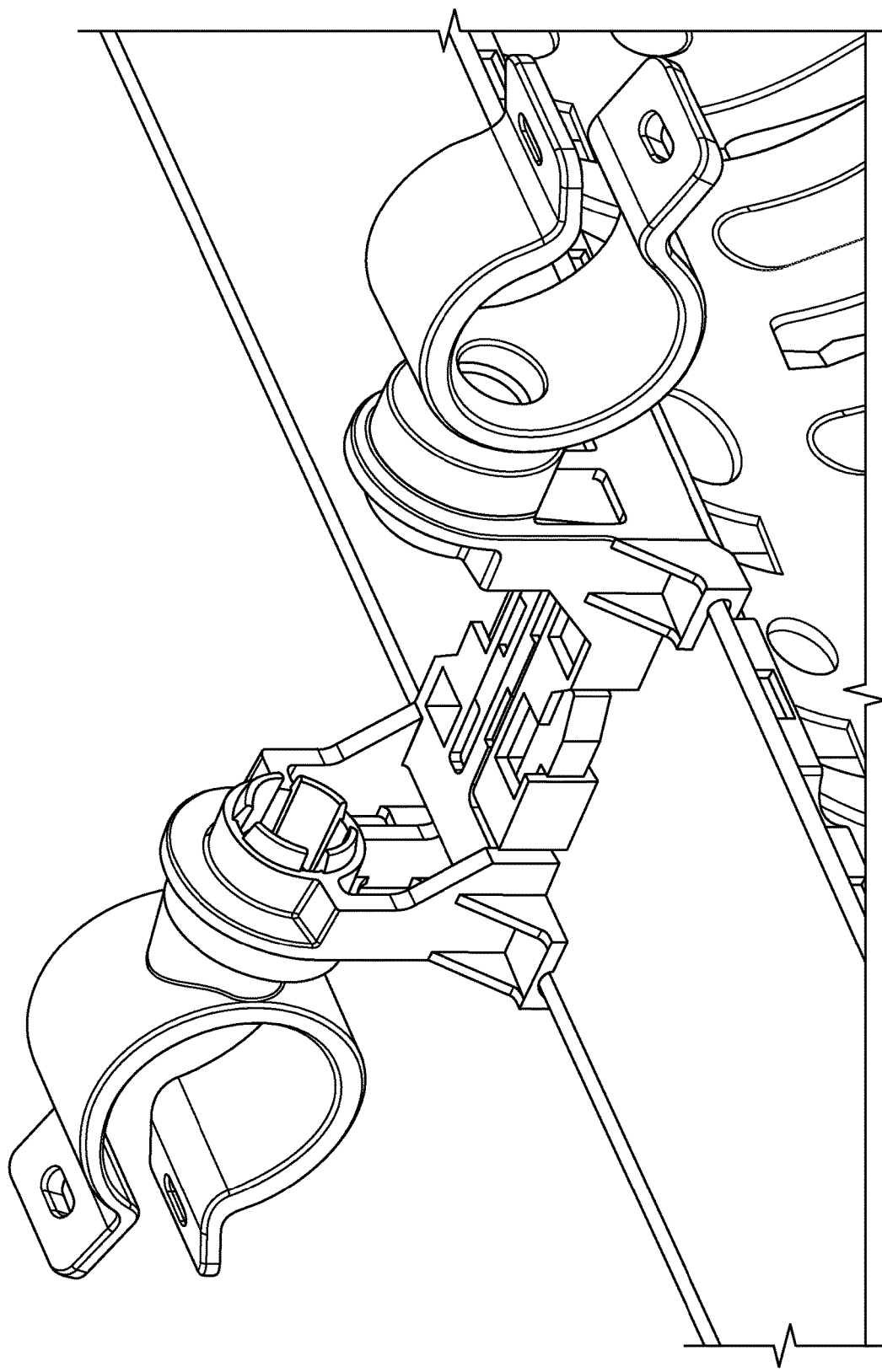
FIG. 11 shows a schematic perspective diagram of first and second parts of an alternate clamp for use in the second embodiment.

FIG. 11 shows schematic perspective diagram of first and second parts of an alternate clamp for use in the second embodiment. The first and second parts of the alternate clamp both comprise a clip fitting and corresponding clips for clipping to cable breakouts.

The scope of the invention is defined by the appended independent claim(s). Further features appearing in the dependent claims and the described embodiments are optional, and may or may not be implemented in various other embodiments of the invention as will be apparent to those skilled in the art.

For example, the clamp of the first embodiment comprises three trunk fittings, although other clamps comprising at least two trunk fittings, for example two trunk fittings according to the second embodiment, or four trunk fittings, are also possible.

The trunk fitting of the first embodiment comprise slots, although other means for engaging the bulbous ends such as pincers may alternatively be used.

The trunk fittings of the first embodiment also comprise sockets across which the slots are formed, although in other embodiments the slots may be formed across means other than sockets, for example across a solid member, or formed by a folded metal sheet as may be done to make the slots 1000 of the second embodiment.

In the first and second embodiments, the rotational relationship between the clip 210 and the clip fitting 205 is fixed by the teeth 610 and 620, although other arrangements of corresponding protrusions and indentations on the clip and clip fitting are also possible as will be apparent to the skilled person.

The invention claimed is:
1. A cable breakout support for a trunking, the cable breakout support comprising:
   a clip for clipping to a cable breakout of a cable bundle supported in the trunking;
   a clip fitting for connecting to the clip; and a clamp for clamping to the trunking, the clamp comprising:
  at least two trunk fittings for fitting to at least two bulbous longitudinal edges of the trunking, each trunk fitting including:
    a trunk socket having a first end and a second end opposite the first end, wherein the trunk socket is open ended; and
    a slot formed at the first end of the trunk socket, wherein the slot is configured to receive one of the at least two bulbous longitudinal edges of the trunking;
  at least two collets, each collet configured to insert into the trunk socket of a corresponding one of the at least two trunk fittings, each collet including:
    a further slot, wherein the further slot is configured to align with the slot of the corresponding one of the at least two trunk fittings and engage the one of the at least two bulbous longitudinal edges of the trunking; and
    a tapered portion, wherein the tapered portion becomes increasingly wider along a longitudinal axis of the collet towards an open end of the further slot, and wherein the tapered portion is configured to be compressed around the one of the at least two bulbous longitudinal edges of the trunking when the collet is fully inserted into the trunk socket of the corresponding one of the at least two trunk fittings; and
    a screw thread disposed at an end of the collet and opposite the further slot; and
  at least two nuts, each nut configured to screw onto a corresponding one of the at least two collets at the second end of the trunk socket of the corresponding one of the at least two trunk fittings, and each nut configured to draw the tapered portion of the corresponding one of the at least two collets into the trunk socket of the corresponding one of the at least two trunk fittings and reduce a space defined by the further slot of the corresponding one of the at least two collets around the one of the at least two bulbous longitudinal edges of the trunking, thereby enabling the corresponding one of the at least two collets to clamp onto the one of the at least two bulbous longitudinal edges of the trunking.

2. The cable breakout support of claim 1, wherein each nut comprises a flange for contacting the corresponding one of the at least two trunk fittings, and wherein each trunk fitting further comprises at least one protrusion for overhanging and contacting the flange of a corresponding one of the at least two nuts.

3. The cable breakout support of claim 2, wherein the flange of each nut comprises ridges for engaging ridges around the second end of the trunk socket of the corresponding one of the at least two trunk fittings.

4. The cable breakout support of claim 2, wherein the further slot of each collet comprises a wider section for receiving the one of the at least two bulbous longitudinal edges of the trunking and a narrower section arranged above the wider section.

5. The cable breakout support of claim 1, wherein each collet comprises a protrusion for inserting into an additional slot of the trunk socket of the corresponding one of the at least two trunk fittings.

6. The cable breakout support of claim 1, wherein the clip fitting comprises a clip socket, and wherein the clip comprises a plug for insertion into the clip socket.

7. The cable breakout support of claim 6, wherein the clip socket is open ended, wherein the cable breakout support further comprises a clip lock for inserting into the clip socket, and wherein the clip lock engages the plug to secure the plug in the clip socket.

8. The cable breakout support of claim 6, wherein the clip fitting and the clip comprise indentations and protrusions for fixing a rotational position of the clip relative to the clamp.

9. The cable breakout support of claim 8, wherein the protrusions include teeth arranged around the clip socket and teeth arranged around the plug.

10. The cable breakout support of claim 1, wherein the clip fitting and the clip comprise indentations and protrusions for fixing a rotational position of the clip relative to the clamp.

11. The cable breakout support of claim 1, wherein the clip comprises two opposing arms for gripping the cable breakout therebetween.

12. The cable breakout support of claim 11, further comprising a retainer, wherein the two opposing arms each comprise an aperture for receiving the retainer, and wherein the retainer is arranged to hold the two opposing arms together for gripping the cable breakout.

13. The cable breakout support of claim 1, wherein the clamp is generally triangular, wherein the at least two trunk fittings comprise three trunk fittings, wherein each of the three trunk fittings is arranged at a corner of the clamp, and wherein each of the three trunk fittings is configured to fit onto the one of the at least two bulbous longitudinal edges of the trunking.

14. The cable breakout support of claim 13, wherein the clip fitting is arranged at a center of the clamp.

15. An apparatus comprising:
  a trunking having at least two bulbous longitudinal edges,
  a cable bundle supported by the trunking,
  a cable breakout exiting the cable bundle, and
  a cable breakout support according to claim 1, wherein the at least two trunk fittings are respectively fitted to the at least two bulbous longitudinal edges, and wherein the cable breakout is clipped by the clip.

16. A modular cable breakout support system comprising:
  a plurality of cable breakout supports of claim 1, wherein the clamps of the plurality of cable breakout supports have different sizes, and wherein the clips of the plurality of cable breakout supports have different sizes to accommodate the clamps of the plurality of cable breakout supports.

* * * * *